United States Patent [19]

Lethbridge

[11] Patent Number: 5,317,270
[45] Date of Patent: May 31, 1994

[54] COLD CATHODE IONIZATION VACUUM GAUGE WITH GUARD RING

[75] Inventor: Paul G. Lethbridge, Lewes E. Sussex, England

[73] Assignee: The BOC Group plc, Surrey, England

[21] Appl. No.: 890,058

[22] Filed: May 28, 1992

[30] Foreign Application Priority Data

May 31, 1991 [GB] United Kingdom ............ 9111747

[51] Int. Cl.$^5$ .................... G01L 21/34; H01J 1/88
[52] U.S. Cl. ................................ 324/460; 313/247; 324/463
[58] Field of Search ............. 324/459, 460, 463, 464; 313/247, 613, 614, 616

[56] References Cited

U.S. PATENT DOCUMENTS

| | | | |
|---|---|---|---|
| 2,137,198 | 11/1938 | Smith | 313/613 X |
| 3,244,990 | 4/1966 | Herb et al. | 313/247 X |
| 3,387,175 | 6/1968 | Lloyd et al. | 324/463 X |
| 3,441,773 | 4/1969 | Roth et al. | 313/614 X |
| 3,505,554 | 4/1970 | Vekshinsky | 324/463 X |
| 4,847,564 | 7/1989 | Limp | 324/460 |
| 4,967,157 | 10/1990 | Peacock | 324/459 X |

Primary Examiner—Gerard R. Strecker
Attorney, Agent, or Firm—David M. Rosenblum; Larry R. Cassett

[57] ABSTRACT

A vacuum guage of the ionisation type having a guage head comprising a substantially cylindrical cathode sleeve with an inlet at one end for communication with the vacuum with an anode positioned co-axially within the cathode sleeve; the head also has a guard ring interposed between the cathode sleeve and the anode and a vacuum feed through arrangement in which the anode and the guard ring are held substantially concentrically within the cathode sleeve.

7 Claims, 2 Drawing Sheets

COLD CATHODE IONIZATION VACUUM GAUGE WITH GUARD RING

BACKGROUND OF THE INVENTION

This invention relates to vacuum gauges and, more particularly, to improvements to cold cathode ionisation vacuum gauges, especially those of the inverted magnetron type.

Cold cathode ionisation gauges for measuring vacuum, sometimes referred to as "Penning" gauges, are well known. They generally comprise an anode and one (or more) cathodes with a large potential difference between the anode and the cathode(s) and a substantial magnetic field applied by a permanent magnet in the area between the electrodes. In these gauges, the anode and cathode are held in a predetermined configuration relative to each other by means of a vacuum feedthrough which isolates the electrodes within the gauge from the atmosphere outside.

With the gauge subjected to the vacuum to be measured, electrons emitted by the cathode are accelerated towards the anode by the electric field; however, the action of the magnetic field causes the electrons to adopt a very long, non-linear trajectory, for example helical, before striking the anode; as such, the probability of ionisation of gas molecules present in the vacuum by collision with the electrons is much higher even at low pressures. Positive ions formed by the collisions are attracted by the cathode to produce an ion current in an external circuit, the size of which is related to the vacuum at a given temperature.

In gauges of the inverted magnetron type, the cathode commonly has associated with it means to define a region within it in which the ion collection, and hence ion discharge current to the external circuit takes place and is measured. This is generally achieved by arranging for the magnetic and electric fields to be concentrated in that region.

In such inverted magnetron gauges, it is possible for a small current to flow directly from the anode to the cathode via the internal surfaces of the gauge and it is known that the presence of a so-called "guard ring" can collect this current and thereby prevent it being detected by the gauge itself. To perform this function, the guard ring is electrically isolated from the cathode and normally held at a small positive potential relative to the cathode.

SUMMARY OF THE INVENTION

The present invention is concerned with the provision of an improved guard-ring arrangement in gauges of this type.

In accordance with the invention, there is provided a vacuum gauge of the ionisation type having a gauge head which comprises:

an outer cathode sleeve having an inlet at one end for communication with the vacuum an anode positioned within the cathode sleeve and extending substantially co-axially therewith a guard ring interposed between the cathode sleeve and the anode positioning means at an end of the cathode sleeve remote from the inlet for positioning the cathode sleeve, the anode and the guard ring in predetermined spatial relationship with one another and in electrical isolation from one another wherein the positioning means and the guard ring are arranged substantially concentrically within the cathode sleeve.

Preferably the cathode sleeve is cylindrical in shape and can usefully be made from stainless steel. The anode will generally be a solid rod of metal, for example stainless steel also.

The guard ring can preferably also be fixed within the cathode sleeve by any convenient means. The guard ring must be isolated electrically from the cathode, preferably by inserting therebetween an insulating material.

The anode is preferably positioned in the gauge head such that it lies substantially on the main axis of the guard ring. It must also be isolated electrically from the guard ring and this is preferably effected by placing an insulating material about the anode and within the ring aperture.

The positioning means for the cathode sleeve, guard ring and anode can thus all be arranged in a substantially radial configuration within the cathode sleeve. Ideally the vacuum feedthrough comprises (positioned within one end of the cathode sleeve) a concentric arrangement comprising the guard ring and the anode with the anode held within the guard ring by means of an electrically insulating seal material.

BRIEF DESCRIPTION OF THE DRAWINGS

For a better understanding of the invention, reference will now be made, by way of exemplification only, to the accompanying drawings in which.

DETAILED DESCRIPTION

Figure 1:
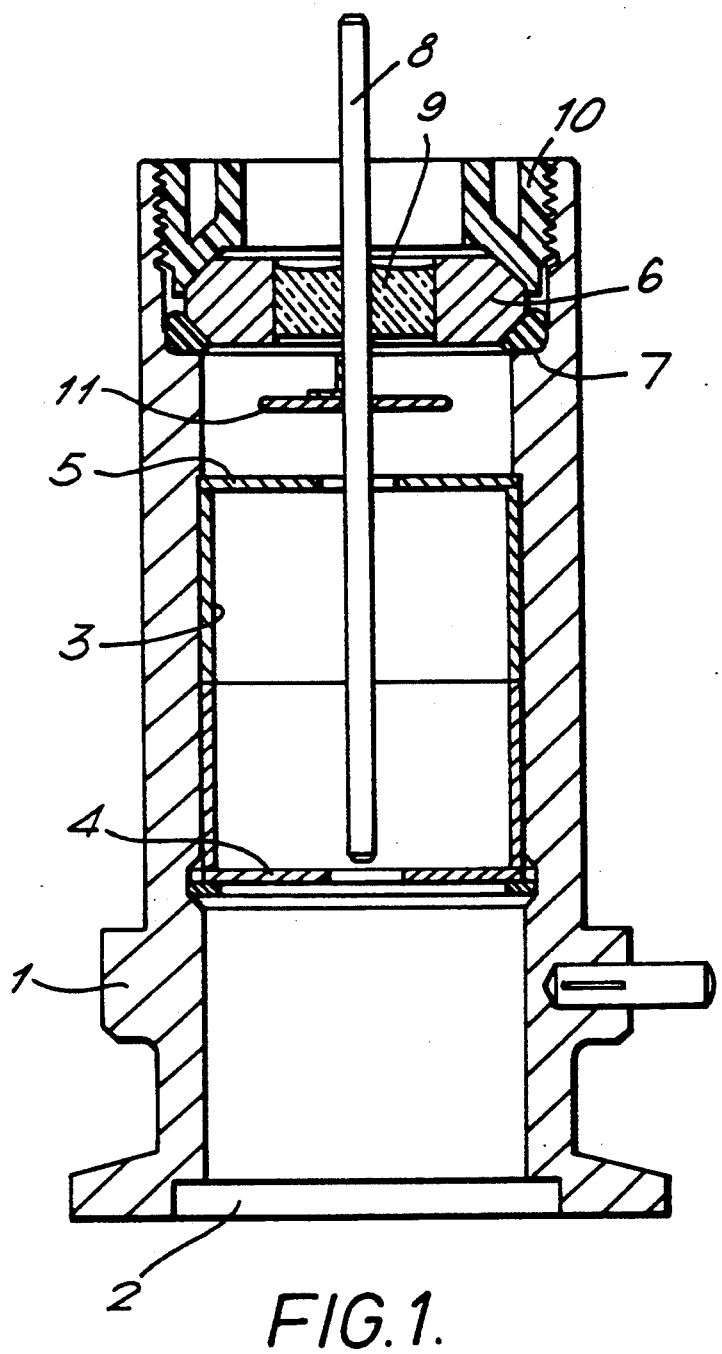
FIG. 1 shows a sectional view through a gauge head of the invention.

With reference to the drawings, FIG. 1 shows a gauge head which comprises a substantially cylindrical cathode sleeve 1 having an inlet 2 at one end for communication with the vacuum to be measured. Within the sleeve 1 is positioned a drum-shaped component 3 having an external diameter substantially the same of the internal diameter of the cathode sleeve 1; the component 3 is held substantially centrally along the length of the sleeve 1.

The component 3 has two circular end portions 4,5, both with circular central apertures. The component 3 is electrically connected to the cathode sleeve 1 and therefore forms an ion collecting region.

Also positioned within the cathode sleeve 1 is a guard ring 6; it is positioned on a radiussed ledge 7 in the cathode sleeve and electrically insulated therefrom by a compressed 'O' ring made of VITON (Trade Mark) A, leaving a 1 mm air gap between these components.

Positioned centrally within the cathode sleeve 1 and passing through the upper (as shown) circular aperture of collector end portion 5 and through the aperture of the guard ring 6 is an anode 8 in the form of a solid rod made from stainless steel.

The anode 8 is held in position by means of a fused glass compression seal 9 placed within the aperture of the guard ring 6. The anode is also held in position by use of a plastic collar 10 which effects further electrical insulation between the guard ring 6 and the cathode sleeve 1.

In addition a circular disc component 11 is positioned about the anode 8 between the guard ring 6 and the collector 3. It is in electrical contact with the anode 8 and acts to repel any ions which might attempt to escape from the collecting region defined by component 3.

As such, the positioning means and the guard ring are arranged in a substantially concentric configuration within the cathode sleeve 1.

The positioning means for the gauge head components described above also performs the function of ensuring that this end of the gauge head is firmly sealed against vacuum at the point of entry of the anode into the head and in the general vicinity of the guard ring.

Figure 2:
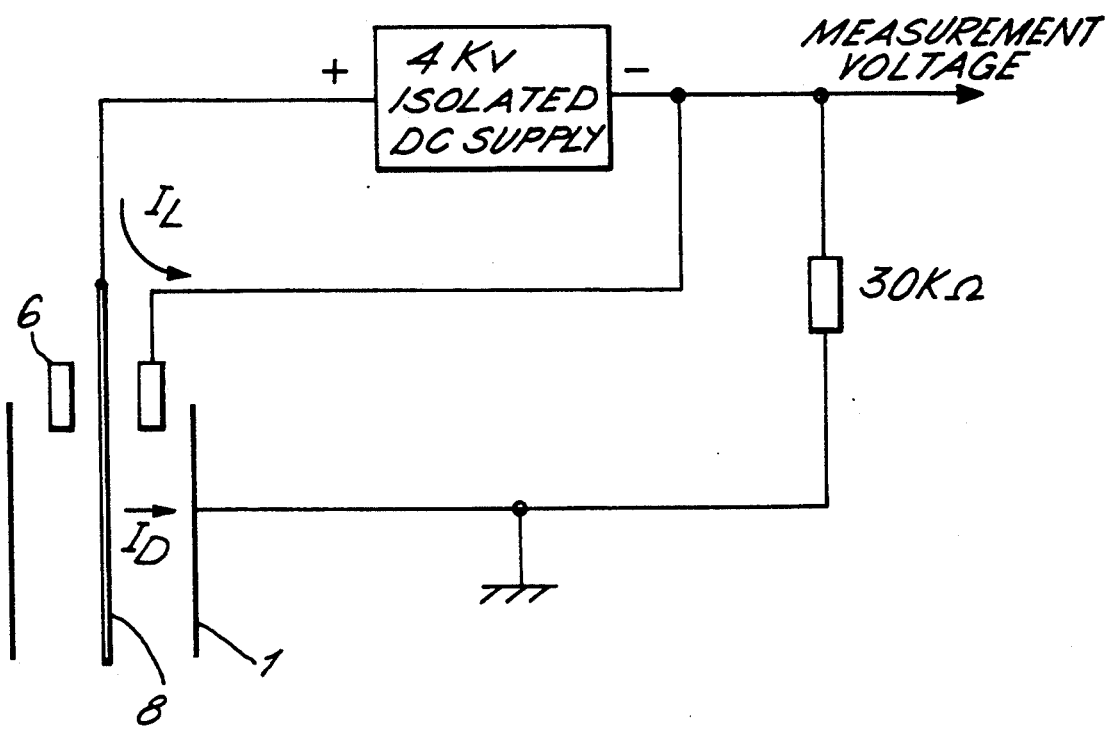
FIG. 2 shows a circuit diagram for the gauge head of FIG. 1.

In use of the gauge, the anode 8 is held at a potential difference of, for example, 4 Kv relative to the cathode sleeve 1 (and to the component 3). As shown in FIG. 2, the gauge operates by measuring the current flowing between the anode and the cathode $I_D$ when a "cold cathode discharge" is formed within region defined by the collector 3 by the ionisation of gas molecules by electrons emitted by the cathode.

If there is any tendency for current $I_L$ to flow directly from the anode to the cathode via the surface of the vacuum feedthrough, i.e. via the seal 9 by virtue, for example, of any moisture that might be present in the gauge, it will be collected by the guard ring 6 and, as shown in FIG. 2, not detected by the gauge measuring circuit which is designed only to detect current flowing directly between the anode and the cathode in the area remote from the region defined collector, in particular via the surface of the vacuum feedthrough, it is collected by the guard ring and, as shown in FIG. 2, is not detectable by the vacuum measuring circuitry which is designed to detect only that current flowing directly from the anode to and the ion collector 3.

I claim:

1. A gauge head for a vacuum gauge of the ionization type comprising:
   an outer cathode sleeve having an inlet at one end for communication with the vacuum;
   an anode of rod-like configuration coaxially extending into the cathode sleeve at the other end thereof;
   an electrically conductive guard ring interposed between the cathode sleeve and the anode to collect electrical current that would otherwise flow within the gauge head directly from the anode to the outer cathode sleeve;
   the guard ring located at the other end of said outer cathode sleeve and positioned such that said anode extends therethrough;
   anode mounting means for mounting the anode within the guard ring in electrical isolation from one another; and
   guard ring connection means for connecting said guard ring to said outer cathode sleeve in electrical isolation from one another.

2. The gauge head according to claim 1 in which the cathode sleeve is cylindrical in shape.

3. The gauge head according to claim 1 or claim 2 in which the anode is a solid rod of metal.

4. The gauge head according to claim 1, wherein said anode mounting means comprises a fused glass compression seal between said anode and said guard ring holding said anode in position within said guard ring.

5. The gauge head according to claim 3, wherein:
   said outer cathode sleeve has an inner radiused ledge located at the other end thereof and a threaded section located above said inner radiused ledge; and
   said guard ring connection means comprises an electrically insulative 'O' ring interposed between said guard ring and said ledge and an externally threaded plastic collar threaded into said threaded section of said outer cathode sleeve so that said guard ring is held in position, bearing against said 'O' ring which in turn presses against said inner radiused ledge of said outer cathode sleeve.

6. The gauge head according to claim 5, wherein said anode mounting means comprises a fused glass compression seal between said anode and said guard ring holding said anode in position within said guard ring.

7. The gauge head according to claim 6, wherein the anode is a solid rod of metal.

* * * * *